United States Patent
Gelbman

(10) Patent No.: US 9,619,692 B2
(45) Date of Patent: Apr. 11, 2017

(54) IMAGE CAPTURE-BASED PREDICTIVE CONTROL DEVICE

(71) Applicant: Siemens Healthcare Diagnostics Inc., Tarrytown, NY (US)

(72) Inventor: Alexander Gelbman, Lake Worth, FL (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 5 days.

(21) Appl. No.: 14/429,752

(22) PCT Filed: Sep. 18, 2013

(86) PCT No.: PCT/US2013/060256
§ 371 (c)(1),
(2) Date: Mar. 19, 2015

(87) PCT Pub. No.: WO2014/047086
PCT Pub. Date: Mar. 27, 2014

(65) Prior Publication Data
US 2015/0269415 A1 Sep. 24, 2015

Related U.S. Application Data

(60) Provisional application No. 61/704,584, filed on Sep. 24, 2012.

(51) Int. Cl.
*G06K 9/00* (2006.01)
*G06F 3/03* (2006.01)
*G06T 7/20* (2017.01)
*H04N 5/232* (2006.01)

(52) U.S. Cl.
CPC ....... *G06K 9/00214* (2013.01); *G06F 3/0304* (2013.01); *G06K 9/00771* (2013.01); *G06T 7/20* (2013.01); *H04N 5/23229* (2013.01); *G06T 2207/20081* (2013.01)

(58) Field of Classification Search
None
See application file for complete search history.

(56) References Cited

U.S. PATENT DOCUMENTS 6,261,522 B1 7/2001 Hough et al.
6,519,607 B1 2/2003 Mahoney
(Continued)

FOREIGN PATENT DOCUMENTS

WO 99/28724 A1 6/1999

OTHER PUBLICATIONS

Tabard et al., "The eLabBench in the wild—supporting exploration in a molecular biology lab", CHI 2012, May 5-12, 2012.*
(Continued)

*Primary Examiner* — Soo Jin Park

(57) ABSTRACT

A system and method for identifying objects being carried by an operator who is approaching an instrument. The system includes image-, motion-, and depth-capturing sensors that are in communication with the instrument. The captured image, motion, and depth data are compared to data stored in a database and the objects are identified. Once the objects have been identified, an action that corresponds to the identified objects is initiated in the instrument.

22 Claims, 4 Drawing Sheets

(56) References Cited

U.S. PATENT DOCUMENTS

| | | | | |
|---|---|---|---|---|
| 7,336,174 B1* | 2/2008 | Maloney | ............ | G08B 13/1427 340/568.1 |
| 8,326,780 B2* | 12/2012 | Gupta | ................. | G06N 99/005 706/14 |
| 8,423,174 B2* | 4/2013 | Koch | ................. | G01N 35/0099 221/9 |
| 8,436,897 B2* | 5/2013 | Naruoka | .................. | G06K 9/00 348/77 |
| 8,644,556 B2* | 2/2014 | Zhou | ....................... | G06F 3/017 348/169 |
| 8,854,182 B2* | 10/2014 | Lobean | .............. | G06K 9/00348 340/5.53 |
| 8,858,351 B2* | 10/2014 | Crawford | ................. | A63G 4/00 463/30 |
| 9,353,990 B2* | 5/2016 | Kim | ........................ | F25D 29/00 |
| 2003/0151735 A1 | 8/2003 | Blumenfeld et al. | | |
| 2006/0252541 A1 | 11/2006 | Zalewski | | |
| 2007/0010019 A1 | 1/2007 | Luoma, II | | |
| 2008/0190953 A1* | 8/2008 | Mallett | .................. | A61L 11/00 221/13 |
| 2009/0037020 A1* | 2/2009 | Brown | ................ | G07F 17/0092 700/240 |
| 2010/0042430 A1* | 2/2010 | Bartfeld | .............. | G06F 19/3456 705/2 |
| 2010/0153457 A1* | 6/2010 | Grant | ...................... | G06F 3/017 707/792 |
| 2012/0119987 A1* | 5/2012 | Im | ........................... | G06F 3/017 345/156 |

OTHER PUBLICATIONS

PCT International Search Report and Written Opinion dated Feb. 26, 2014 (12 Pages).

Benabdelkader, et al., Detection of People Carrying Objects: a Motion-based Recognition Approach, Automatic Face and Gesture Recognition, 2002. Proceedings. Fifth IEEE International Conference, Retrieved on [Jul. 2, 2014]. Retrieved from the internet: <URL:https://www.cs.umd.edu/users/chiraz/fg_objectcarry.pdf> entire document.

Extended EP Search Report dated May 19, 2016 of corresponding European Application No. 13839687.4, 4 Pages.

Leandro Cruz et al: "Kinect and RGBD Images: Challenges and Applications", Graphics, Patterns and Images Tutorials (SIBGRAPI-T), 2012 25th SIBGRAPI Conference on, IEEE, Aug. 22, 2012 (Aug. 22, 2012), pp. 36-49, XP032283171, DOI: 10.1109/SIBGRAPI-T2012.13, ISBN: 978-1-4673-5091-4.

* cited by examiner

IMAGE CAPTURE-BASED PREDICTIVE CONTROL DEVICE

FIELD OF THE INVENTION

A method and system for automatically initiating a pre-designated response by an analysis instrument that is adapted to determine the nature and/or the number of objects being carried by an operator.

BACKGROUND OF THE INVENTION

The number of systems, i.e., instruments or devices, that have computer-controlled interfaces continues to increase. Generally, an operator or technician using these systems needs to enter information manually, i.e., enter it in by hand, whether it be typing on a physical keyboard, touching an icon on a touchscreen, or activating, via physical contact, a button, latch or other mechanical device.

For an operator, whose hands are full, if physical interaction with a system is necessary, then whatever is being carried must either be put down or juggled with one hand while physically interacting with the system (problematic if what is being carried should not be shaken or dropped). Hands-free operation would, therefore, be beneficial.

BRIEF SUMMARY OF THE INVENTION

A device is provided that will identify one or more items being carried by an approaching person. Once the nature and/or number of items being carried is identified, the system will then initiate an appropriate anticipatory action that corresponds to the identified items.

In one embodiment, a method of initiating a response corresponding to a first object being transported by an operator includes capturing first image data of the first object and transmitting the captured first image data to a processing device. The processing device compares the captured first image data to previously stored data and identifies the first object based on the comparison. A predetermined first action corresponding to the identified first object is retrieved; and the predetermined first action is implemented on an instrument.

BRIEF DESCRIPTION OF THE SEVERAL VIEWS OF THE DRAWINGS

Other features and advantages of the invention will be apparent from the following description of the various embodiments thereof and from the claims, taken in conjunction with the accompanying drawings, in which:

DETAILED DESCRIPTION OF THE INVENTION

Figure 1:
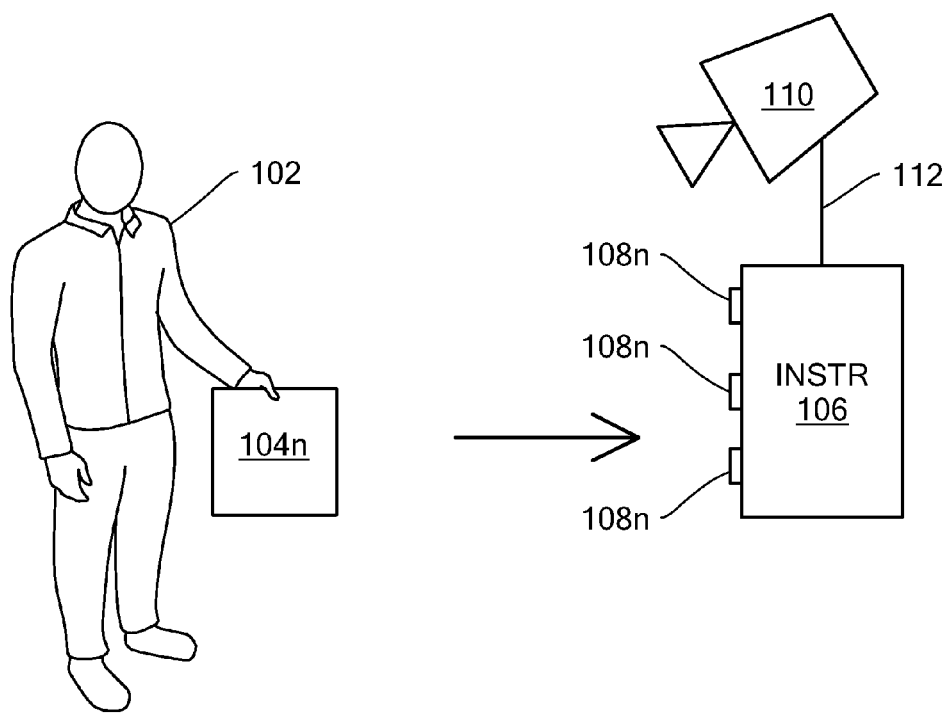
FIG. 1 is a schematic representation of an embodiment of the present invention.

Generally, embodiments of the present invention are applicable in environments where a system with one or more clinical laboratory instruments is used by an operator, e.g., a technician, that may be carrying items and, therefore, might not be able to enter information or activate a physical device (switch, etc.) because their hands are, otherwise, engaged. It should be noted that the present disclosure references an "instrument," however, this is merely for ease of describing the embodiments of the present invention and not meant to be limited to a single instrument but may also include a system of integrated, modular, instruments. Thus, referring to FIG. 1, an operator 102 may be carrying one or more items 104n destined for an interaction and/or to be used in conjunction with an instrument 106. The item 104n may be one that is to be introduced into the instrument 106. Further, the item 104n may be destined for a specific portion 108n of the instrument 106 for a specific purpose. For example, and not intended to be limiting, the item 104n may be a containment vessel, e.g., a tube for holding a specimen, a puck, a rack or a tray for holding one or more containment vessels, a reagent container, a carrier, e.g., a box, for holding a plurality of reagent containers, a consumable part e.g. a cuvette, a disposable tip, control material, calibrator material, a specific part, or a replacement carousel, any of which may be either empty or full.

The different portions 108n of the instrument 106 may be, for example, and not intended to be limiting, a drawer, a loading area, a track, a belt, a carousel, and the like, into which the item 104n should be placed. Additionally, each portion 108n could be a different instrument in a system of instruments or a different part of the same instrument having a corresponding specific function.

An identifying system 110 is an integral part of the instrument 106 and/or is coupled to the instrument 106 via a wired or wireless connection 112 as will be described in more detail below. The identifying system 110 is configured to identify the one or more items 104n being carried by the operator 102 and then to cause the instrument 106, and if applicable, the appropriate portion 108n, to be ready to receive, or otherwise interact with, the items 104n. The condition of being ready to receive may include opening a cover, door, safety device or removing an object intended to prevent unanticipated or unsafe access to the appropriate portion 108n.

Figure 2:
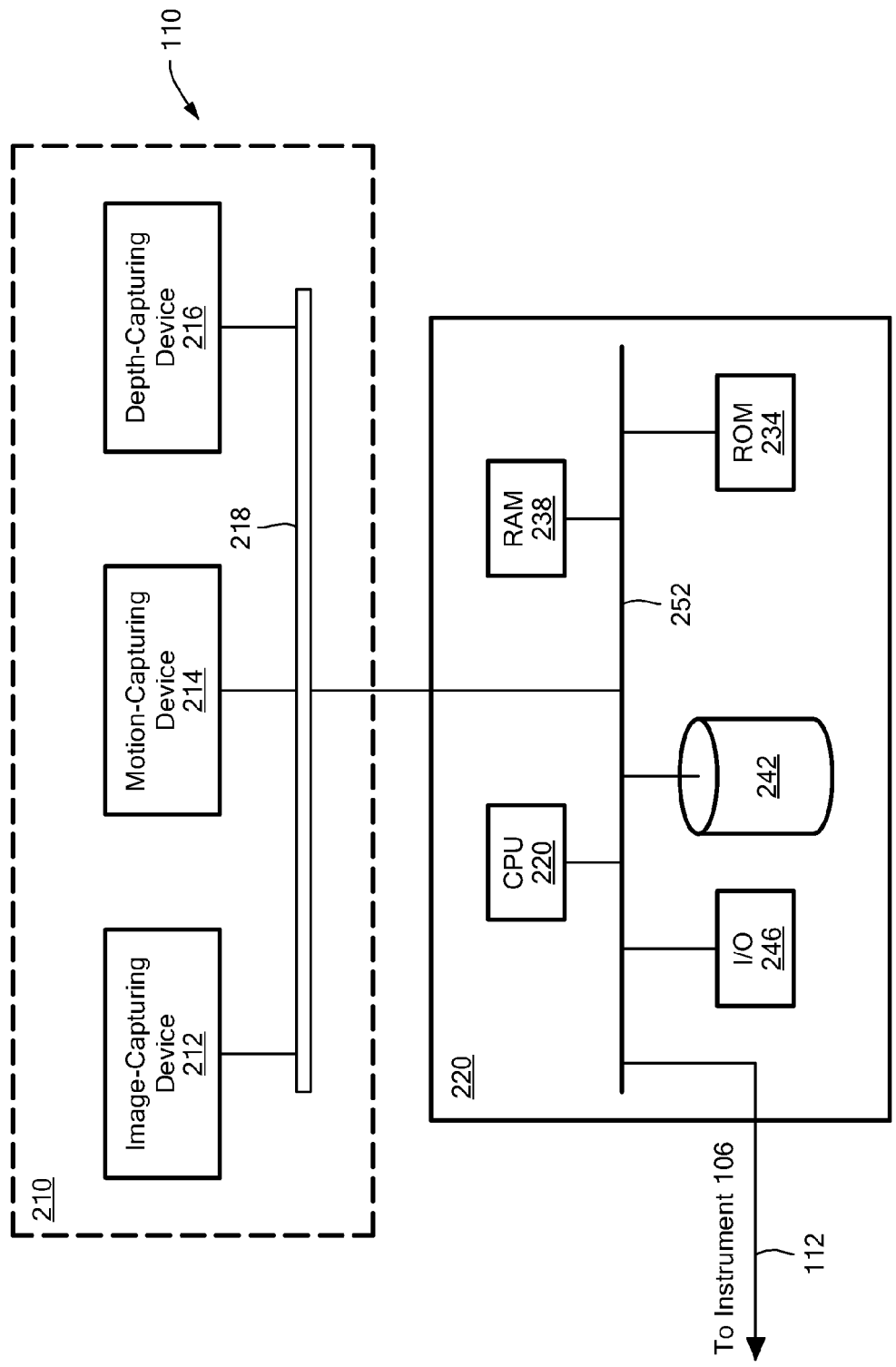
FIG. 2 shows a block diagram of an image capture-based, predictive control system in accordance with an embodiment of the present invention.

The identifying system 110, as shown in FIG. 2, includes a data gathering portion 210 and a processing device 220. The data-gathering portion 210 includes at least one of; an image-capturing device 212, a motion-capturing device 214, and a depth-capturing device 216, all of which are in communication with the processing device 220 via, in one embodiment, an electrical or physical bus 218, or, in another embodiment, via a wireless connection.

The image-capturing device 212 can be, for example, any range camera technology, e.g., a RGB camera, and the like, that is capable of acquiring and outputting video images of anything in its field of view at a frame rate of at least 230 Hertz using at least 8-bit VGA resolution and having a range of between 1 and 4 m.

The motion-capturing device 214 and the depth-capturing device 216 can include an infrared (laser) projector and a monochrome (CMOS) sensor that are capable of capturing video data in three dimensions under ambient light conditions. The projector and the RGB camera are adapted to track movement within the field of view in three-dimensions. The video stream of the monochrome sensor can have an 11-bit depth VGA resolution.

All-in-one systems that include image-, motion and depth-capturing functions, e.g., the Wii™ Remote Plus by Nintendo, the PlayStation® Move by Sony, and the Kinect® by Microsoft, may be used in one or more embodiments of the present invention. These all-in-one systems provide one or more of: facial recognition, voice recognition, gesture recognition, and motion capture capabilities to provide hands-free control of electronic devices. With each device, at least one sensing device, e.g., an optical device, such as an RGB camera; a depth sensor, such as an infrared laser projector, a CMOS sensor, etc., and so forth, is structured and arranged to track the movement of objects in three dimensions.

The processing device 220 includes a central processing unit 230, and at least one of: a read-only memory (ROM) 234, a random access memory (RAM) 238, a storage device 242, e.g., a hard drive, and an input/output (I/O) device 246, e.g., display, keyboard, mouse, etc. All are in communication with one another and with the data gathering portion 210, the instrument 106 and the instrument bus 112 via a processing bus 252.

As will be described in detail below, the processing device 220 implements a method of identifying one or more items 104n being carried. In accordance with information previously stored, once an item 104n is identified, a corresponding process is implemented. Thus, depending upon the item, one or more portions 108n of the instrument 106 may be called into action.

In one embodiment, the ROM 222 or storage device 242 stores a program for execution by the CPU 220. The program may be transferred from the ROM 222 or storage device 242 to the RAM 221 as executable software that can be run from the RAM 221. Information may be stored as a database in the ROM 222 or the storage device 242 which may be accessed to identify an item 104n and which then may also include information as to whether a specific program is to be run on the processing device 220 to control the instrument 106 once an item 104n is identified. An example of the operation and the initiation process is provided in greater detail below.

Further, a database that includes a multiplicity of electronic images, electronic files, or pattern recognition data, look-up tables, and the like, of items that may be used with or around the instrument 106 may also be provided. The items can include, without limitation, a variety of containment vessels, e.g., tubes for holding a specimen, pucks, racks or trays for holding one or more containment vessels, reagent containers, carousel rings, reaction vessels, reaction vessel holding devices, and so forth. The stored electronic data images may be used to compare the captured real-time image, motion, and depth data with the stored representations of items.

The processing device 220 includes the capability to receive image, motion, and depth data from the corresponding image-, motion-, and depth-capturing device 212, 214, 216. The processing device 220 is configured to compare the received data with the multiplicity of stored data.

Identification may be based on one or more of: size, shape, color, patterns, how the object is being carried, optical reflection, etc. In addition, amount and/or color of the material contained in an object such as a containment vessel or a reagent cartridge, provided the container is transparent, bar codes, and optical character recognition (OCR) may also be used for recognition or matching.

Once the item 104n being transported by the approaching operator 102 is identified, the processing device 220 coordinates a respective action of the instrument 106. This may include either directly controlling some portion of the instrument 106 or sending a command to the instrument 106, e.g., "open drawer A."

A method of capturing image data and using the data to anticipate an approaching operator's likely intentions and, moreover, to initiate an appropriate response in a diagnostic instrument in furtherance of those intensions will now be described.

Figures 3, 3A:
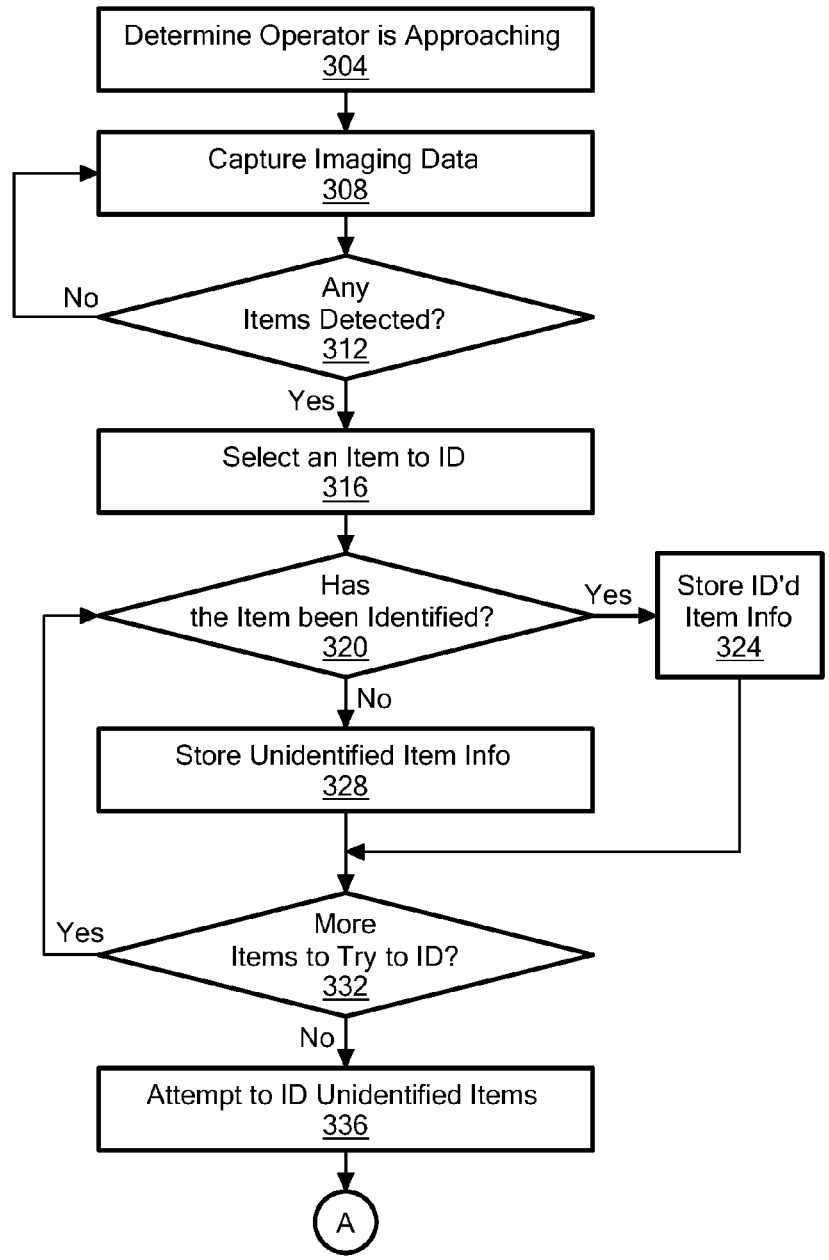
FIGS. 3, 3A and 3B show a flow chart of a method in accordance with an embodiment of the present invention.
Figure 3B:
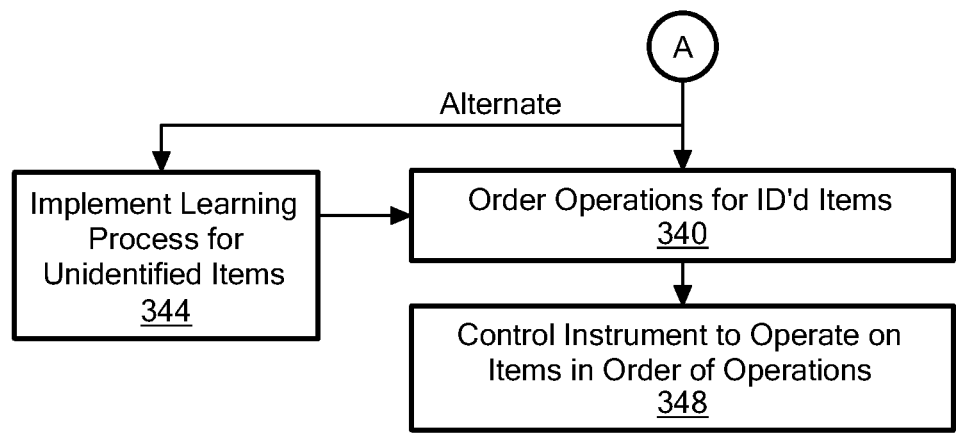

Referring now to FIGS. 3, 3A and 3B, the data capturing device 210 detects an approaching operator, step 304, and image data is captured, step 308. At step 312, it is determined whether or not the approaching operator is carrying an item. At this point, it is only a determination if an item is being carried in order not to waste processing time on a passerby who is empty-handed and/or moving in a direction inconsistent with approaching the instrument 106 for the purpose of initiating an action.

If it is determined that an item is present, control passes to step 316 where one of the detected items is selected for possible identification, otherwise control passes back to step 308. A process is started to attempt an identification of the selected item, step 320. This may involve comparisons to the stored data described above. As previously described, the databases may contain image, motion, and/or depth data of a multiplicity of objects. A match is determined when matching criteria exceed a preset confidence limit. The system responds when the limit is met, otherwise, no action is taken and the operator may have to revert to manually accessing the instrument. Methods of comparing acquired data with stored data for the purpose of identifying objects are well-known in the art and will not be described in greater detail.

Once the item has been identified, the identification information is stored, step 324 and, at step 332, it is determined if there are more items to identify. If so, control passes back to step 320. Returning to step 320, if the item is not identified, its image data information is stored for later processing, step 328.

Once all items have either been identified, or an attempt to identify has been made, control passes to step 336 where an attempt is made to identify the unidentified items. This may involve more processing and include other indications such as inferences based on the identified items that are with the unidentified items. When it is not possible to match the item 104n carried by an operator 102 with any of the images, in the database, it may be possible to identify the item 104n by comparing the manner in which the operator 102 is carrying and/or the characteristic of the carrying motion resulting from the operator's handling the item 104n. Hence, another database may include a multiplicity of electronic images, electronic files, look-up tables, and the like that can be used to correlate how an item 104n is being carried by the operator 102 and how it moves while being carried to order identify the item 104n.

Alternatively, if an identification cannot be made, then a manual learning process for adding the item 104n to the database may be optionally implemented, step 344. This could involve manual entry being made by the operator or entry into the database through a formal approval process.

Continuing, at step 340, an order of operations based on the identified items may be made. It is possible that some items require that they be attended to before others either for priority, process or safety reasons. The pre-established priority sequence may be logically- and efficiency-driven to ensure that the items are introduced into the instrument to promote quick introduction, replacement, and so forth and so as to not adversely impact proper or efficient operation of the instrument. Accordingly, status signals could be received and processed as to the status of replacement consumables and, therefore, any urgent need for replacing the consumables could be addressed. For example, were the operator trying to replace an empty reagent container with a full one and to add more tube trays, because the empty reagent container prevents or could prevent further processing of the samples on the instrument, then the pre-established priority sequence would prioritize initiating the action having to do with the reagent container prior to taking an appropriate action for the tube trays.

Once an order is determined, if needed, the instrument 106 is controlled to make the necessary portion 108n available, step 348. For example, if the approaching operator is carrying an object that is identified as a reagent container, the processing device can cause the instrument to open an appropriate housing, e.g., a drawer or carousel, into which the identified reagent container is inserted. Alternately, a carrier in the instrument designed to hold the identified reagent container may be brought to a loading point. For another example, if the approaching operator 102 is carrying an item 104n that is identified as a tray, puck or rack containing one, or a plurality of, specimen tubes and/or containment vessels, the processing device 220 can cause the instrument 106 to open or safely allow access to an appropriate portion 108n of the instrument 106 thereby allowing the operator 102 to efficiently place the items 104n they were carrying into and/or onto an appropriate drawer(s) or loading area. The actual action executed by the processing device and the instrument depends on the instrument and the identified object. Advantageously, the method may execute the appropriate instrument response before the operator reaches the instrument thereby reducing dwell time and increasing throughput.

Although various embodiments of the invention have been described above, it will be recognized and understood that modifications may be made in the invention and that the appended claims are intended to cover all such modifications which fall within the spirit and scope of the invention.

What I claim is:

1. A method of initiating a response corresponding to at least one object being transported by an operator, wherein each of the at least one object is to be introduced into an instrument, the method comprising:
   capturing first image data of a first object of the at least one object being transported by the operator;
   transmitting the captured first image data to a processing device;
   determining whether the operator is approaching the instrument;
   determining whether the operator is transporting at least one object;
   in response to determining that the operator is approaching the instrument and that the operator is carrying at least one object, comparing, by the processing device, said captured first image data to previously stored data;
   identifying, by the processing device, the first object based at least in part on said comparison;
   in response to identifying the first object as being an object to be received by the instrument, retrieving a predetermined first action corresponding to the identified first object;
   monitoring a status of consumable materials used by the instrument;
   determining a sequence of the predetermined first action and at least one additional action to be implemented on the instrument based on the status of the consumable materials; and
   automatically implementing, by the processing device, the predetermined first action and the at least one additional action on the instrument in accordance with the sequence.

2. The method of claim 1, wherein capturing first image data comprises at least one of:
   capturing motion data about the first object, and
   capturing depth data about the first object.

3. The method as recited in claim 2, wherein comparing said captured first image data to previously stored data comprises:
   comparing at least one of the captured motion data and captured depth data to the previously stored data.

4. The method as recited in claim 1, wherein the operator is transporting a second object, in addition to the first object, the method further comprising:
   capturing second image data of the second object;
   transmitting the captured second image data to the processing device;
   comparing, by the processing device, said captured second image data to previously stored data;
   identifying, by the processing device, the second object based on said comparison; and
   in response to identifying the second object as being another object to be received by the instrument, retrieving a predetermined second action corresponding to the identified second object,
   wherein determining the sequence of the predetermined first action and the at least one additional action includes determining a sequence of the predetermined first and second actions based on pre-established respective priorities of the predetermined first and second actions and based on the status of the consumable materials.

5. The method as recited in claim 4, wherein determining the sequence comprises prioritizing the first and second predetermined actions as a function of relative urgencies of a respective replacement status of the first and second objects.

6. The method as recited in claim 1, wherein retrieving a predetermined first action comprises accessing stored information.

7. The method as recited in claim 1, wherein identifying the first object based on said comparison comprises:
   setting a comparison value for each comparison of the captured first image data to the previously stored data;
   comparing the comparison value to a match threshold value; and
   identifying the first object if the comparison value meets or exceeds the match threshold value.

8. The method as recited in claim 1, wherein the first object is chosen from:
   a tray, a puck or a rack containing one or more specimen tubes or containment vessels; and
   a reagent container.

9. The method as recited in claim 1, wherein the predetermined first action comprises one of:
   a) opening one of: a drawer, a door, or a cover; or
   b) providing access to a loading area.

10. The method as recited in claim 1, wherein the instrument is a clinical diagnostic laboratory instrument.

11. The method as recited in claim 1, wherein, when identifying the first object, the processing device is further configured to, in response to not identifying the first object based on the comparison of the captured first image data to previously stored data, identify the first object based at least in part on at least one of: how the first object is being carried by the operator, how the first object moves while being carried, and any identified items that are being carried with the first object.

12. The method as recited in claim 1, wherein, when identifying the first object, the processing device is further configured to identify the first object based at least in part on at least one of: an amount of material contained in the first object and a color of the material contained in the first object.

13. A system for initiating a response corresponding to at least one object being transported by an operator, wherein each of the at least one object is to be introduced into an instrument, the system comprising:
an image-capturing device that captures first image data of a first object of the at least one object being transported by the operator;
a database comprising stored pre-identified object data; and
a processing device, coupled to the image-capturing device and the database, configured to:
determine whether the operator is approaching the instrument;
determine whether the operator is transporting at least one object;
in response to determining that the operator is approaching the instrument and that the operator is carrying at least one object, compare the first image data to the stored pre-identified object data;
identify the first object as a first pre-identified object based at least in part on the comparison;
in response to identifying the first object as being an object to be received by the instrument, retrieve a predetermined first action corresponding to the first pre-identified object;
monitoring a status of consumable materials used by the instrument;
determining a sequence of the predetermined first action and at least one additional action to be implemented on the instrument based on the status of the consumable materials; and
automatically implement the predetermined first action and the at least one additional action on the instrument in accordance with the sequence.

14. The system as recited in claim 13, wherein the image-capturing device comprises at least one of:
a motion-capturing device configured to capture motion data; and
a depth-capturing device configured to capture depth data.

15. The system as recited in claim 14, wherein the processing device is further configured to, when comparing said first image data to the stored pre-identified object data, compare at least one of the captured motion data and captured depth data to the stored pre-identified object data.

16. The system as recited in claim 13, wherein the processing device is further configured to:
receive second image data of a second object of the at least one object being transported by the operator;
compare said second image data to the stored pre-identified object data;
identify the second object based at least in part on said comparison;
in response to identifying the second object as being another object to be received by the instrument, retrieve a predetermined second action corresponding to the identified second object,
wherein determining the sequence of the predetermined first action and the at least one additional action includes determine a sequence of the predetermined first and second actions based on pre-established respective priorities of the predetermined first and second actions and based on the status of the consumable materials.

17. The system as recited in claim 16, wherein determining the sequence comprises:
prioritizing the first and second predetermined actions as a function of relative urgencies of a respective replacement status of the first and second objects.

18. The system as recited in claim 13, wherein the processing device is further configured to:
set a comparison value for each comparison of the first image data to the stored pre-identified object data;
compare the comparison value to a match threshold value; and
identify the first object if the comparison value meets or exceeds the match threshold value.

19. The system as recited in claim 13, wherein the first object is chosen from:
a tray, a puck or a rack containing one or more specimen tubes or containment vessels; and
a reagent container.

20. The system as recited in claim 13, wherein the predetermined first action comprises one of:
a) opening one of: a drawer, a door or a cover; or
b) providing access to a loading area.

21. The system as recited in claim 13, wherein the instrument is a clinical diagnostic laboratory instrument.

22. A system for initiating a response corresponding to at least one object being transported by an operator, the system comprising:
an image-capturing device that captures first image data of a first object of the at least one object being transported by the operator;
a database comprising stored pre-identified object data; and
a processing device, coupled to the image-capturing device and the database, configured to:
determine whether the operator is approaching an instrument;
determine whether the operator is transporting at least one object;
in response to determining that the operator is approaching the instrument and that the operator is carrying at least one object, compare the first image data to the stored pre-identified object data;
identify the first object as a first pre-identified object based at least in part on the comparison;
retrieve a predetermined first action corresponding to the first pre-identified object;
receive second image data of a second object of the at least one object being transported by the operator;
compare said second image data to the stored pre-identified object data;
identify the second object based at least in part on said comparison;
retrieve a predetermined second action corresponding to the identified second object;
determine a sequence of the predetermined first and second actions based on respective priorities; and
implement the predetermined first and second actions in the determined sequence on the instrument,
wherein the processing device is further configured to monitor a status of consumable materials used by the instrument; and
wherein, in response to the first object being a replacement for the consumable materials, determining the sequence of the predetermined first and second actions is further based on the status of the consumable materials used by the instrument.

\* \* \* \* \*